US009058095B2

(12) United States Patent
Choi

(10) Patent No.: US 9,058,095 B2
(45) Date of Patent: Jun. 16, 2015

(54) METHOD FOR DISPLAYING DATA IN MOBILE TERMINAL HAVING TOUCH SCREEN AND MOBILE TERMINAL THEREOF

(75) Inventor: Kyungdong Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 485 days.

(21) Appl. No.: 12/879,912

(22) Filed: Sep. 10, 2010

(65) Prior Publication Data

US 2011/0122077 A1 May 26, 2011

(30) Foreign Application Priority Data

Nov. 25, 2009 (KR) .................. 10-2009-0114795

(51) Int. Cl.
G06F 3/041 (2006.01)
G06F 3/0481 (2013.01)
G06F 3/0484 (2013.01)
G06F 3/0488 (2013.01)

(52) U.S. Cl.
CPC .............. *G06F 3/0484* (2013.01); *G06F 3/041* (2013.01); *G06F 3/0481* (2013.01); *G06F 3/04845* (2013.01); *G06F 3/04883* (2013.01); *G06F 2203/04806* (2013.01)

(58) Field of Classification Search
CPC ............................................. G06F 2203/04806
USPC ................................................. 345/173–178
See application file for complete search history.

(56) References Cited

U.S. PATENT DOCUMENTS

| 6,781,597 | B1 | 8/2004 | Vrobel et al. | |
|---|---|---|---|---|
| 6,825,859 | B1* | 11/2004 | Severenuk et al. | 715/764 |
| 2004/0141010 | A1* | 7/2004 | Fitzmaurice et al. | 345/810 |
| 2008/0192020 | A1* | 8/2008 | Kang et al. | 345/173 |
| 2008/0297484 | A1* | 12/2008 | Park et al. | 345/173 |
| 2009/0077497 | A1* | 3/2009 | Cho et al. | 715/814 |
| 2009/0228820 | A1* | 9/2009 | Kim et al. | 715/769 |
| 2009/0237421 | A1 | 9/2009 | Kim et al. | |
| 2009/0259935 | A1* | 10/2009 | Kramer et al. | 715/234 |
| 2010/0005390 | A1 | 1/2010 | Bong | |
| 2010/0058254 | A1* | 3/2010 | Narita | 715/863 |
| 2010/0073303 | A1* | 3/2010 | Wu et al. | 345/173 |
| 2010/0169819 | A1* | 7/2010 | Bestle et al. | 715/773 |

* cited by examiner

*Primary Examiner* — Gerald Johnson
*Assistant Examiner* — Christopher Kohlman
(74) *Attorney, Agent, or Firm* — Birch, Stewart, Kolasch & Birch, LLP

(57) ABSTRACT

A method of controlling a mobile terminal includes displaying, via a touch screen included on the mobile terminal, predetermined data, receiving, via a controller included on the mobile terminal, a first touch signal generated based on a first touch, generating, via the controller, a display change notifying signal to notify the generation of the first touch signal, displaying, via the touch screen, the display change notifying signal, changing an input mode of the touch screen to a first mode, according to the first touch signal, and modifying, via the controller, the displayed predetermined data based on a second touch signal generated by a second touch on the touch screen in the first mode.

12 Claims, 18 Drawing Sheets

METHOD FOR DISPLAYING DATA IN MOBILE TERMINAL HAVING TOUCH SCREEN AND MOBILE TERMINAL THEREOF

Pursuant to 35 U.S.C. §119 (a), this application claims the benefit of earlier filing date and right of priority to Korean Patent Application No. 10-2009-0114795, filed on Nov. 25, 2009, the contents of which are hereby incorporated by reference in their entirety.

BACKGROUND OF THE INVENTION

1. Field of the Invention

The present invention relates to a mobile terminal and corresponding method for displaying data.

2. Description of the Related Art

Generally, terminals can be classified into mobile/portable terminals and stationary terminals. The mobile terminals can be further classified into handheld terminals and vehicle mount terminals.

With increasing number of various functions for mobile terminals, the mobile terminals are widely used as a multimedia player having the ability to photograph photos or moving pictures, to playback of music or moving picture files, to play games, to watch broadcast programs, etc. However, the user sometimes has a difficulty operating or executing various features on the mobile terminal.

SUMMARY OF THE INVENTION

Accordingly, one object of the present invention is to address the above-noted and other problems.

Another object of the present invention is to provide a novel mobile terminal and corresponding method that provides convenient multitasking functions to users.

To achieve these and other advantages and in accordance with the purpose of the present invention, as embodied and broadly described herein, the present invention provides in one aspect a method of controlling a mobile terminal, and which includes displaying, via a touch screen included on the mobile terminal, predetermined data, receiving, via a controller included on the mobile terminal, a first touch signal generated based on a first touch, generating, via the controller, a display change notifying signal to notify the generation of the first touch signal, displaying, via the touch screen, the display change notifying signal, changing an input mode of the touch screen to a first mode, according to the first touch signal, and modifying, via the controller, the displayed predetermined data based on a second touch signal generated by a second touch on the touch screen in the first mode.

In another aspect, the present invention provides a mobile terminal including a touch screen configured to display predetermined data and to receive a plurality of touch inputs, controller configured to generated a first touch signal based on a first touch input and a display change notifying signal to notify the generation of the first touch signal, to change an input mode of the touch screen to a first mode according to the first touch signal, and to modify the displayed predetermined data based on a second touch signal, generated based on a second touch input on the touch screen, in the first mode, and a wireless communication configured to transmit the predetermined data to at least one other terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE PREFERRED EMBODIMENTS

Hereinafter, a mobile terminal relating to embodiments of the present invention will be described below in more detail with reference to the accompanying drawings. Further, the mobile terminal described in the specification can include a cellular phone, a smart phone, a laptop computer, a digital broadcasting terminal, personal digital assistants (PDA), a portable multimedia player (PMP), a navigation system and so on.

Figure 1:
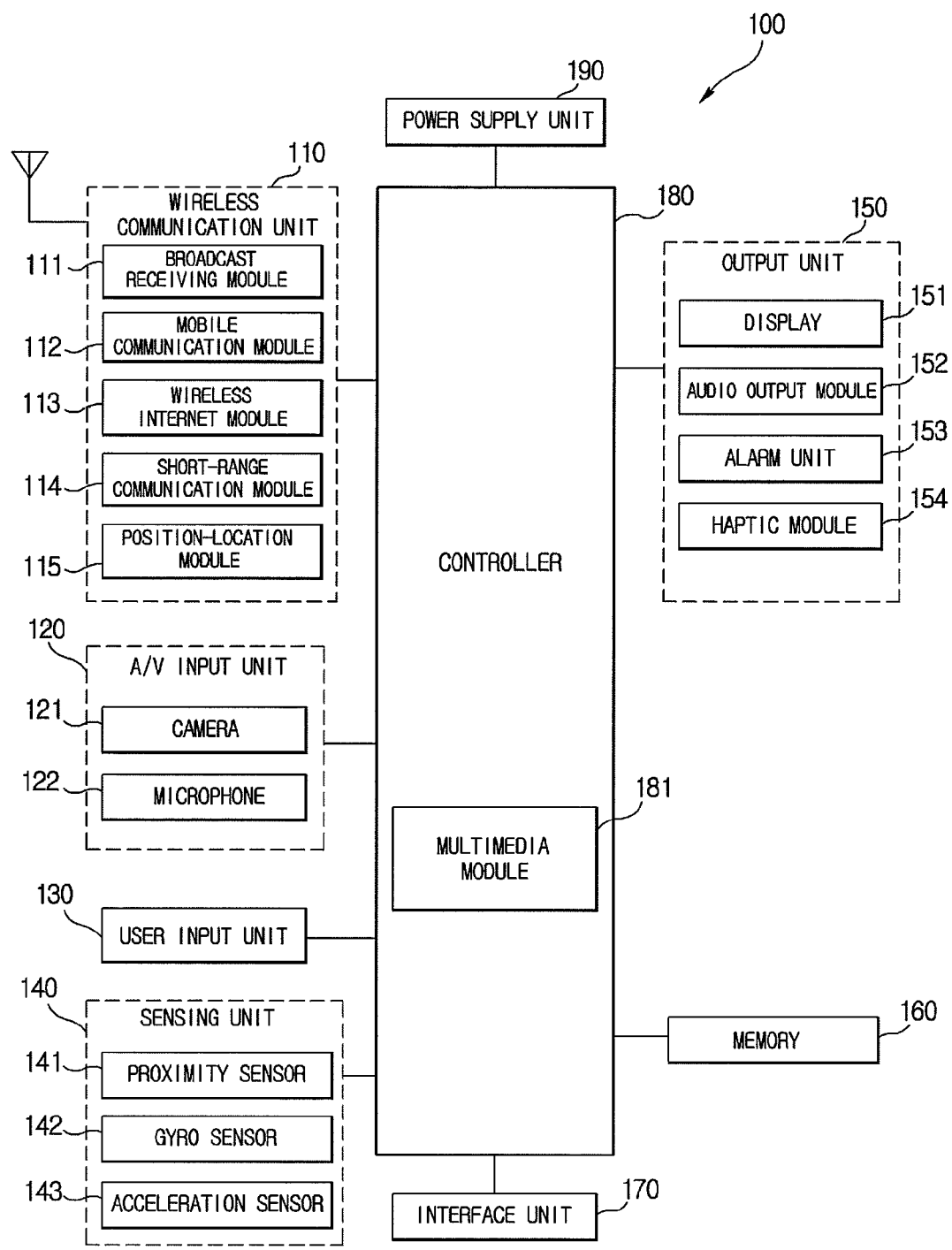
FIG. 1 is a block diagram of a mobile terminal according to an embodiment of the present invention.

FIG. 1 is a block diagram of a mobile terminal 100 according to an embodiment of the present invention. As shown, the mobile terminal 100 includes a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 are essential parts and the number of components included in the mobile terminal can be varied.

In addition, the radio communication unit 110 includes at least one module that enables radio communication between the mobile terminal 100 and a radio communication system or between the mobile terminal 100 and a network in which the mobile terminal 100 is located. For example, in FIG. 1, the radio communication unit 110 includes a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel. Further, the broadcasting channel can include a satellite channel and a terrestrial channel. Also, the broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals, but also signals in the form of a combination of a TV broadcasting signal and a radio broadcasting signal.

In addition, the broadcasting related information can be information on a broadcasting channel, a broadcasting program or a broadcasting service provider. The broadcasting related information can be provided even through a mobile communication network. In this instance, the broadcasting related information can be received by the mobile communication module 112. The broadcasting related information can also exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system.

In addition, the broadcasting receiving module 111 receives broadcasting signals using various broadcasting systems. In particular, the broadcasting receiving module 111 can receive digital broadcasting signals using digital broadcasting systems such as the digital multimedia broadcasting-terrestrial (DMB-T) system, the digital multimedia broadcasting-satellite (DMB-S) system, the media forward link only (MediaFLO) system, and the DVB-H and integrated services digital broadcast-terrestrial (ISDB-T) system. The broadcasting receiving module 111 can also be constructed to be suited to broadcasting systems providing broadcasting signals other than the above-described digital broadcasting systems. The broadcasting signals and/or broadcasting related information received through the broadcasting receiving module 111 can also be stored in the memory 160.

Further, the mobile communication module 112 transmits/receives a radio signal to/from at least one of a base station, an external terminal, and a server on a mobile communication network. The radio signal can include a voice call signal, a video telephony call signal or data in various forms according to transmission and receiving of text/multimedia messages. The wireless Internet module 113 corresponds to a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique. The local area communication module 114 corresponds to a module for local area communication. Bluetooth, radio frequency identification (RFID), infrared data association (IrDA), ultra wideband (UWB) and ZigBee can be used as a local area communication technique.

In addition, the position information module 115 confirms or obtains the position of the mobile terminal 100. A global positioning system (GPS) module is a representative example of the position information module 115. Further, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude coordinates at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photographing mode. The processed image frames can be displayed on a display 151 included in the output unit 150. In addition, the image frames processed by the camera 121 can be stored in the memory 160 or transmitted to an external device through the radio communication unit 110. The mobile terminal 100 can also include at least two cameras according to constitution of the terminal.

Further, the microphone 122 receives an external audio signal in a call mode, a recording mode or a speed recognition mode and processes the received audio signal into electric audio data. The audio data can also be converted into a form that can be transmitted to a mobile communication base station through the mobile communication module 112 and output in the call mode. The microphone 122 can employ various noise removal algorithms for removing noise generated when the external audio signal is received.

In addition, the user input unit 130 receives input data for controlling the operation of the terminal from a user. The user input unit 130 can include a keypad, a dome switch, a touch pad (constant voltage/capacitance), jog wheel, jog switch and so on. The sensing unit 140 senses the current state of the mobile terminal 100, such as an open/close state of the mobile terminal 100, the position of the mobile terminal 100, whether a user touches the mobile terminal 100, the direction of the mobile terminal 100 and acceleration/deceleration of the mobile terminal 100 and generates a detection signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can include a proximity sensor 141.

In addition, the output unit 150 generates visual, auditory or tactile output and in FIG. 1 includes the display 151, an audio output module 152, an alarm 153, and a haptic module 154. The display 151 displays information processed by the mobile terminal 100. For example, the display 151 displays a UI or graphic user interface (GUI) related to a telephone call when the mobile terminal is in the call mode. The display 151 also displays a captured or/and received image, UI or GUI when the mobile terminal 100 is in the video telephony mode or the photographing mode.

The display 151 can also include at least one of a liquid crystal display, a thin film transistor liquid crystal display, an organic light-emitting diode display, a flexible display and a three-dimensional display. Some of these displays can be of a transparent type or a light transmission type, which is referred to as a transparent display. The transparent display also includes a transparent liquid crystal display. The rear structure of the display unit 151 can also be of the light transmission type. According to this structure, a user can see an object located behind the body of the mobile terminal 100 through an area of the body of the mobile terminal 100, which is occupied by the display 151.

Further, the mobile terminal 100 can include at least two displays 151 according to constitution of the terminal. For example, the mobile terminal 100 can include a plurality of displays that are arranged on a single face at a predetermined distance or integrated. Otherwise, the plurality of displays can be arranged on different sides. In addition, when the display 151 and a gyro sensor 142 form a layered structure, which is referred to as a touch screen hereinafter, the display 151 can be used as an input device in addition to an output device. The gyro sensor 142 can be in the form of a touch film, a touch sheet and a touch pad, for example.

Also, the gyro sensor 142 can be constructed such that it converts a variation in pressure applied to a specific portion of the display 151 or a variation in capacitance generated at a specific portion of the display 151 into an electric input signal. The gyro sensor 142 can also be constructed such that it can sense pressure of touch as well as the position and area of touch. When touch input is applied to the gyro sensor 142, a signal corresponding to the touch input is transmitted to a touch controller. The touch controller then processes the signal and transmits data corresponding to the processed signal to the controller 180. Accordingly, the controller 180 can detect a touched portion of the display 151.

Referring to FIG. 1, the proximity sensor 141 can be located in an internal region of the mobile terminal 100, surrounded by the touch screen, or near the touch screen. The proximity sensor 141 senses an object approaching a predetermined sensing face or an object located near the proximity sensor 141 using an electromagnetic force or infrared rays without having mechanical contact. Further, the proximity sensor 141 has a lifetime longer than that of a contact sensor and has wide application. The proximity sensor 141 also includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

In addition, a capacitive touch screen is constructed such that a proximity of a pointer is detected through a variation in an electric field according to the proximity of the pointer. In this instance, the touch screen (touch sensor) can be classified as a proximity sensor. For convenience of explanation, an action of approaching the pointer to the touch screen while the pointer is not in contact with the touch screen such that the location of the pointer on the touch screen is recognized is referred to as a "proximity touch" and an action of bringing the pointer into contact with the touch screen is referred to as a "contact touch" in the following description. Also, a proximity touch point of the pointer on the touch screen means a point of the touch screen to which the pointer corresponds perpendicularly to the touch screen when the pointer proximity-touches the touch screen.

Further, the proximity sensor 141 senses a proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can also be displayed on the touch screen.

Also, the audio output module 152 can output audio data received from the radio communication unit 110 or stored in the memory 160 in a call signal receiving mode, a telephone call mode or a recording mode, a speech recognition mode and a broadcasting receiving mode. The audio output module 152 also outputs audio signals related to functions (for example, a call signal incoming tone, a message incoming tone, etc.) performed in the mobile terminal 100. The audio output module 152 can include a receiver, a speaker, a buzzer, etc.

The alarm 153 outputs a signal for indicating a generation of an event of the mobile terminal 100. Examples of events generated in the mobile terminal 100 include receiving a call signal, receiving a message, inputting a key signal, inputting touch, etc. The alarm 153 can also output signals in forms different from video signals or audio signals, for example, a signal for indicating a generation of an event through vibration. The video signals or the audio signals can also be output through the display unit 151 or the audio output module 152.

In addition, the haptic module 154 generates various haptic effects that the user can feel. A representative example of the haptic effects is vibration. The intensity and pattern of vibration generated by the haptic module 154 can also be controlled. For example, different vibrations can be combined and output or sequentially output. The haptic module 154 can also generate a variety of haptic effects including an effect of stimulus according to an arrangement of pins vertically moving for a contact skin face, an effect of stimulus according to a jet force or sucking force of air through a jet hole or a sucking hole, an effect of stimulus of rubbing the skin, an effect of stimulus according to contact of an electrode, an effect of stimulus using an electrostatic force and an effect according to reproduction of cold and warmth using an element capable of absorbing or radiating heat in addition to vibrations. Further, the haptic module 154 can not only transmit haptic effects through direct contact but also allow the user to feel haptic effects through kinesthetic sense of his or her fingers or arms. The mobile terminal 100 can also include at least two or more haptic modules 154 according to constitution of the mobile terminal.

In addition, the memory 160 stores a program for the operation of the controller 180 and temporarily stores input/output data (for example, phone book, messages, still images, moving images, etc.). The memory 160 can also store data about vibrations and sounds in various patterns, which are output when a touch input is applied to the touch screen. The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

Further, the interface 170 serves as a path to all external devices connected to the mobile terminal 100. The interface 170 receives data or power from the external devices and transmits the data or power to the internal components of the mobile terminal 100 or transmits data of the mobile terminal 100 to the external devices. The interface 170 can also include a wired/wireless headset port, an external charger port, a wired/wireless data port, a memory card port, a port for connecting a device having a user identification module, an audio I/O port, a video I/O port, an earphone port, etc., for example.

In addition, an identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a port.

Also, the interface 170 can serve as a path through which power from an external cradle is provided to the mobile terminal 100 when the mobile terminal 100 is connected to the external cradle or a path through which various command signals input by the user through the cradle to the mobile terminal 100. The various command signals or power input from the cradle can be used as a signal for confirming whether the mobile terminal 100 is correctly set in the cradle.

The controller 180 controls the overall operation of the mobile terminal. For example, the controller 180 performs control and processing for voice communication, data communication and video telephony. In FIG. 1, the controller 180 includes a multimedia module 181 for playing multimedia. The multimedia module 181 can be included in the controller 180 or separated from the controller 180. Further, the controller 180 can perform a pattern recognition process capable of recognizing handwriting input or picture-drawing input applied to the touch screen as characters or images. In addition, the power supply 190 receives external power and internal power and provides power required for the operations of the components of the mobile terminal under the control of the controller 180.

Further, various embodiments of the present invention can be implemented in a computer or similar device readable recording medium using software, hardware or a combination thereof, for example. According to a hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. The embodiments can also be implemented by the controller 180.

According to a software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Figure 2A:
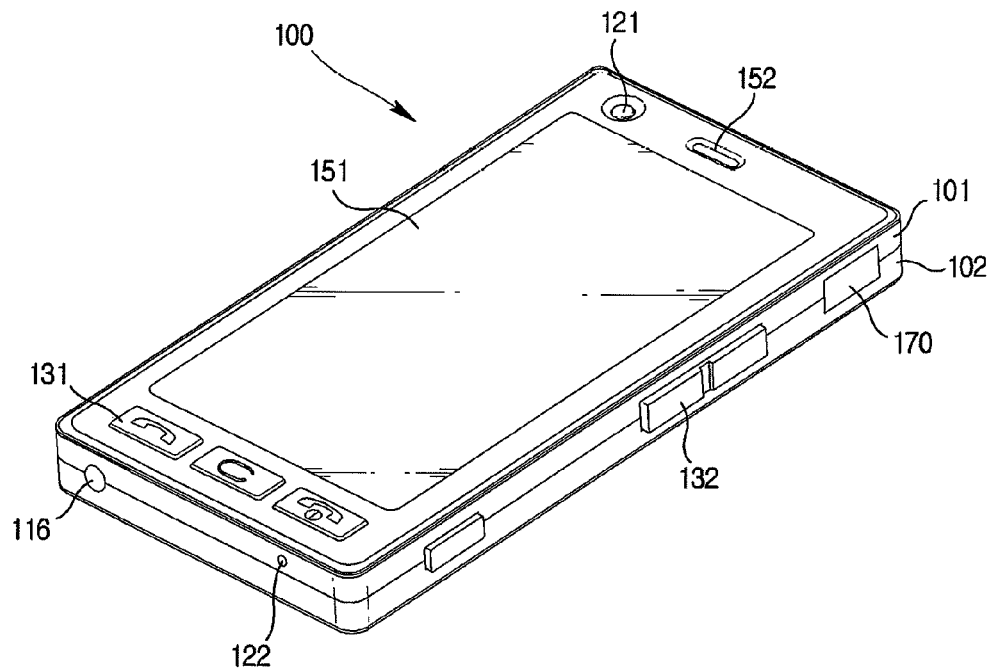
FIG. 2A is a front-view of a mobile terminal according to an embodiment of the present invention.

Next, FIG. 2A is a front perspective view of a mobile terminal or a handheld terminal 100 according to an embodiment of the present invention. As shown, the mobile terminal 100 is a bar type terminal body. However, the present invention is not limited to a bar type terminal and can be applied to terminals of various types including a slide type, folder type, swing type and swivel type terminals having at least two bodies that are relatively movably combined.

In addition, the terminal body includes a case (a casing, a housing, a cover, etc.) forming the exterior of the terminal 100. In the present embodiment, the case is divided into a front case 101 and a rear case 102. Various electronic components are also arranged in the space formed between the front case 101 and the rear case 102. At least one middle case can be additionally arranged between the front case 101 and the rear case 102. The cases can also he formed of plastics through injection molding or be made of a metal material such as stainless steel (STS) or titanium (Ti).

In addition, the display 151, the audio output unit 152, the camera 121, user input units 131 and 132 of the user input unit 130 (FIG. 1), the microphone 122 and the interface 170 are arranged in the terminal body, specifically, in the front case 101. Also, the display 151 occupies most part of the main face of the front case 101. The audio output unit 152 and the camera 121 are arranged in a region in proximity to one of both ends of the display 151 and the user input unit 131 and the microphone 122 are located in a region in proximity to the other end of the display 151. In addition, the user input unit 132 and the interface 170 are arranged on the sides of the front case 101 and the rear case 102.

Further, the user input unit 130 is operated to receive commands for controlling the operation of the handheld terminal 100 and can include the operating units 131 and 132. The operating units 131 and 132 can be referred to as manipulating portions and employ any tactile manner in which a user operates the operating units 131 and 132 while having tactile feeling. The operating units 131 and 132 can also receive various inputs. For example, the operating unit 131 receives commands such as start, end and scroll, and the second operating unit 132 receives commands such as control of the volume of sound output from the audio output unit 152 or conversion of the display 151 to a touch recognition mode.

Figure 2B:
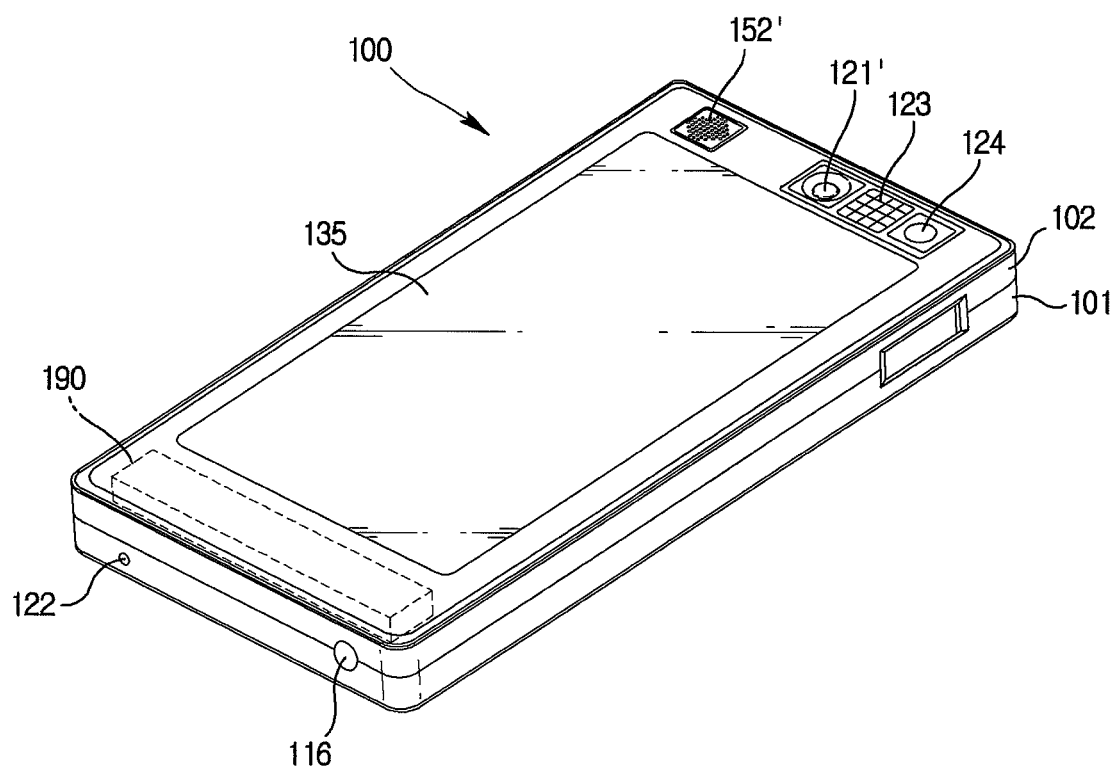
FIG. 2B is a perspective diagram of a backside of the mobile terminal shown in FIG. 2A.

Next, FIG. 2B is a rear perspective view of the mobile terminal 100 shown in FIG. 2A according to an embodiment of the present invention. Referring to FIG. 2B, a camera 121' is additionally attached to the rear side of the terminal body, that is, the rear case 102. The camera 121' has a photographing direction opposite to that of the camera 121 shown in FIG. 2A and can have pixels different from those of the camera 121 shown in FIG. 2A. For example, it is preferable that the camera 121 has low pixels such that it can capture an image of the face of a user and transmit the image to a receiving part for video telephony, while the camera 121' has high pixels because it captures an image of a general object and does not immediately transmit the image in many instances. The cameras 121 and 121' can also be attached to the terminal body such that they can be rotated or pop-up.

A flash bulb 123 and a mirror 124 are also arranged in proximity to the camera 121'. The flash bulb 123 lights an object when the camera 121' takes a picture of the object, and the mirror 124 is used for the user to look at his/her face in the mirror when the user wants to self-photograph himself/herself using the camera 121'. An audio output unit 152' is also provided on the rear side of the terminal body. The audio output unit 152' can thus achieve a stereo function with the audio output unit 152 shown in FIG. 2A and be used for a speaker phone mode when the terminal is used for a telephone call.

A broadcasting signal receiving antenna 124 is also attached to the side of the terminal body in addition to an antenna for telephone calls. The antenna 124 constructing a part of the broadcasting receiving module 111 shown in FIG. 1 can be set in the terminal body such that the antenna 124 can be retracted from the terminal body. Further, the power supply 190 for providing power to the handheld terminal 100 is set in the terminal body. The power supply 190 can be included in the terminal body or detachably attached to the terminal body. A touch pad 135 for sensing touch is also attached to the rear case 102. The touch pad 135 can be of a light transmission type as the display 151. In this instance, if the display 151 outputs visual information through both sides thereof, the visual information can be recognized through the touch pad 135. The information output through both sides of the display 151 can also be controlled by the touch pad 135. Otherwise, a display is additionally attached to the touch pad 135 such that a touch screen can be arranged even in the rear case 102. The touch pad 135 also operates in connection with the display 151 of the front case 101. The touch pad 135 can be located in parallel with the display 151 behind the display 151, and can be identical to or smaller than the display 151 in sizes.

Figure 3A:
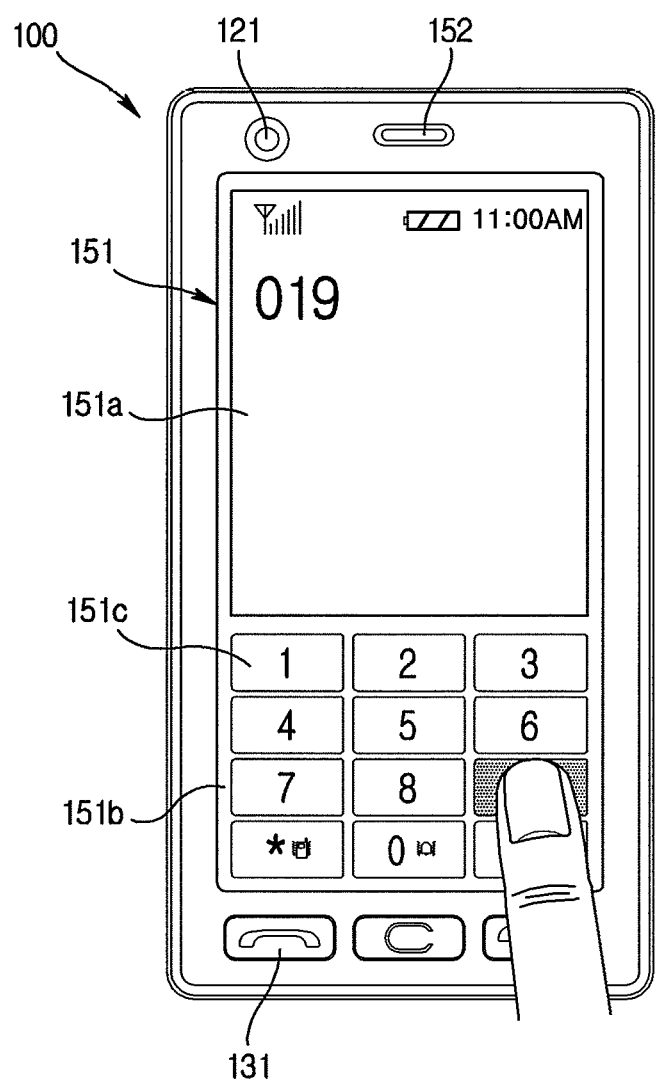
FIGS. 3A and 3B are front views of a mobile terminal for illustrating an operation status of the mobile terminal according to an embodiment of the present invention.
Figure 3B:
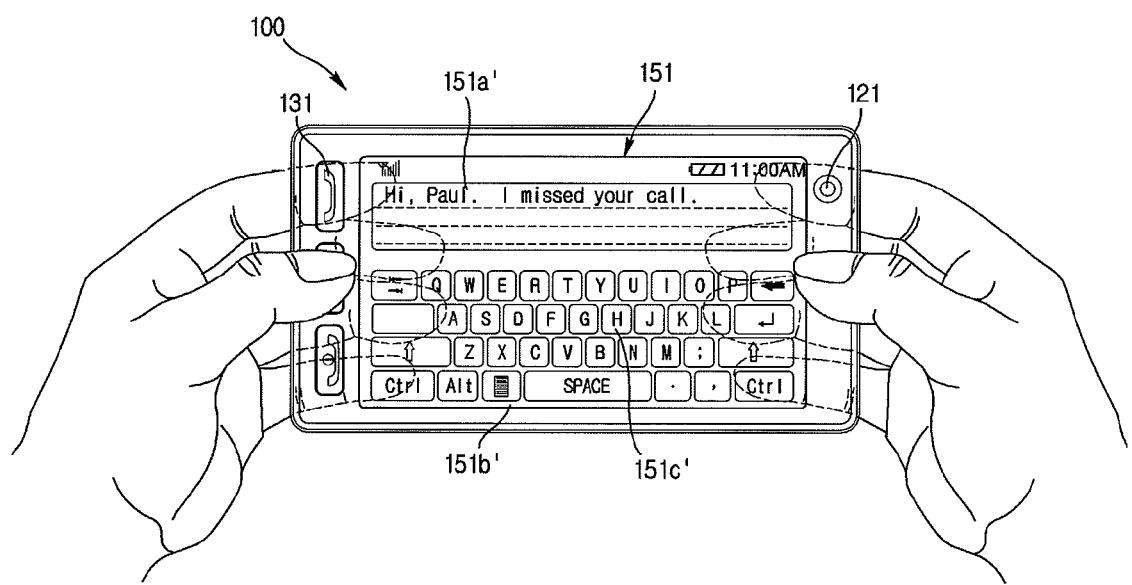

Next, FIGS. 3A and 3B are front perspective views of the mobile terminal 100 during an operation according to an embodiment of the present invention. The display 151 displays various types of visual information including texts, numbers, symbols, graphics, icons, and so on. The user can select the visual information arranged in a predetermined order by pressing a keypad called a "soft key."

In particular, FIG. 3A is a front view of the mobile terminal 100, arranged in a longitudinal way (portrait), with the soft key provided on a front surface according to an embodiment of the present invention. The controller 180 can divide the display 151 into a plurality of areas, where each area can operate inter-connectively with each other. On the other hand, the controller 180 can operate the display 151 on the entire area without any division. For example, referring to FIG. 3A, the display 151 is divided into an upper output window 151a to output information and a lower input window 151b to input information. The input window 151b also includes a soft key 151c having numbers for input of telephone numbers and the like. When the user touches the soft key 151c, numbers corresponding to the touched soft key are displayed on the output window 151a. Then, the user can press a first manipulating unit 131 to make a phone call to a telephone number displayed on the output window 151a.

Next, FIG. 3B is a front view of the mobile terminal 100, arranged in a crosswise way (landscape), with the soft key provided on a front surface according to an embodiment of the present invention. The display 151 is divided into an output window 151a' and an input window 151b'. The controller 180 can change the position of an output window on the display 151 according to arrangement direction of the terminal body. Referring to FIG. 3B, the input window 151b' includes a plurality of soft keys 151c' having at least one of a text, a symbol and numbers. Additionally, the controller 180 can arrange the plurality of soft keys 151c' in the form of QWERTY keys. Here, when the soft keys 151c' are touched via the touch pad 135, the controller 180 displays texts, numbers and symbols corresponding to the touched soft keys 151c' on the output window 151a'. Further, when the display 151 and the touch pad 135 are transparently formed, the user can visually check the positions of fingers on a rear surface of the terminal body, providing a more accurate touch input.

In addition, the display 151 or the touch pad 135 can be configured to receive the touch via scroll. The user can scroll the display 151 or the touch pad 135 to move a displayed image by using a cursor or a pointer pointing at an icon. Furthermore, when the user moves a finger on the display 151 or the touch pad 135, the controller 180 can visually follow and display a path of the finger's movement on the display 151, which can be useful in editing the displayed image. Further, when the user clamps the terminal body with a thumb and an index finger, thereby simultaneously touching the display 151 and the touch pad 135 for a predetermined time, activation or deactivation of the display 151 or the touch pad 135 can be employed, for example.

Figure 4:
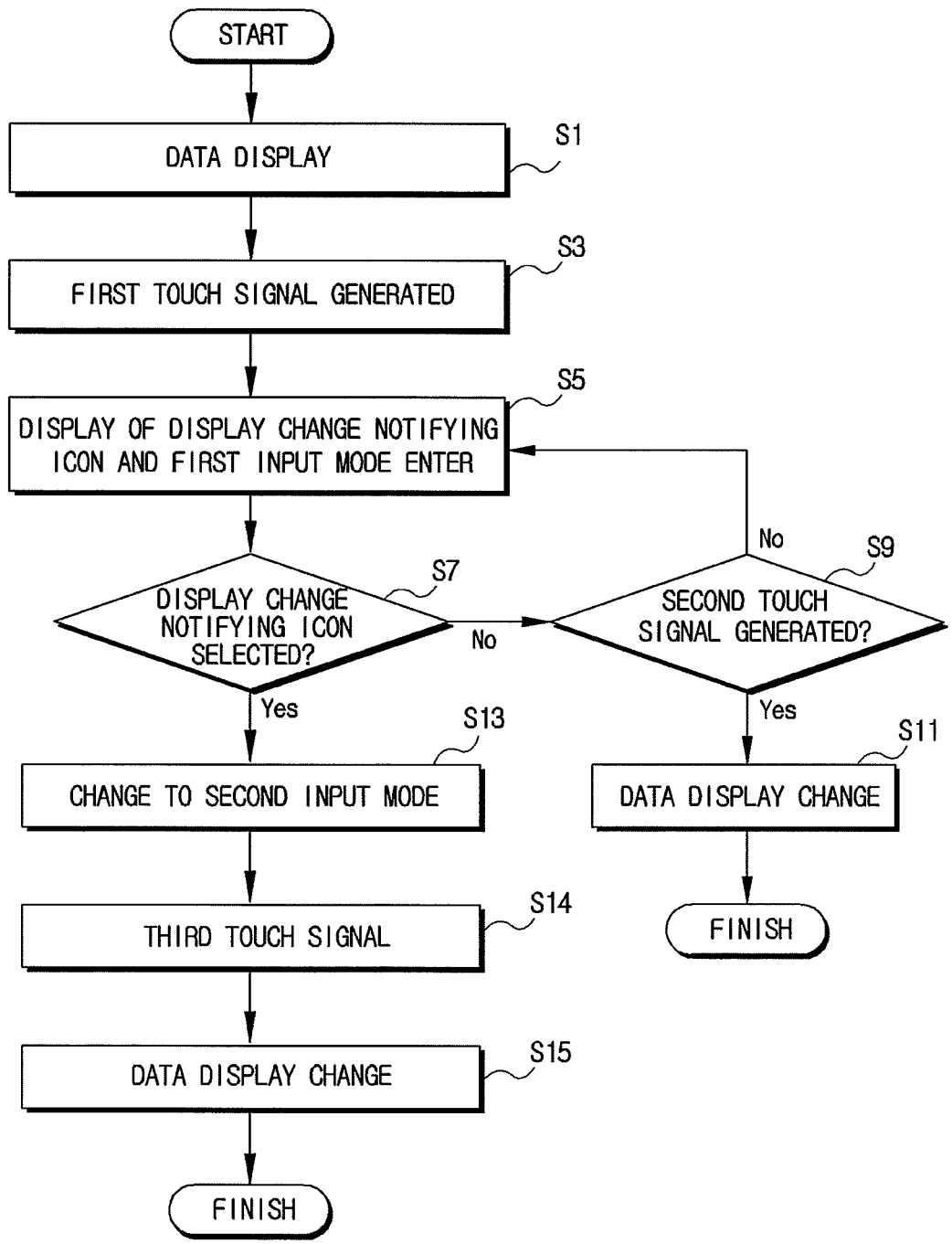
FIG. 4 is a flowchart illustrating a data display control method in a mobile terminal having a touch screen according to an embodiment of the present invention.

Next, a method for displaying data on a mobile terminal having a touch screen according to an embodiment of the present invention will be described in detail with reference to FIG. 4. In particular, FIG. 4 is a flowchart illustrating a method of controlling data display on a mobile terminal having a touch screen according to an embodiment of the present invention. As shown, the controller 180 displays a predetermined data on the touch screen 151 (S1). The data can be an image data, wallpaper, a menu screen, a web data, a web page, a webpage data and an e-book data. The data can be stored in the memory 160 or transmitted from an external server.

Further, when a first touch signal is generated (S3), the controller 180 simultaneously displays a display change notifying icon and the data on the touch screen 151 (S5). Alternatively, the controller 180 can notify the generation of the first touch signal by changing the color of the displayed data without displaying the display change notifying icon on the touch screen 151. At this time, the controller 180 can also simultaneously display a data control menu and the display change notifying icon according to the first touch signal. The data control menu may include at least one of a page change menu, an edit menu and a transmission menu. Further, the controller 180 can change an input mode of the touch screen to a first input mode while displaying the display change notifying icon.

Additionally in FIG. 4, the controller 180 detects a selection signal for selecting the display change notifying icon (S7). When the display change notifying icon is not selected during the selection signal while displaying the display change notifying icon (No in S7), the controller 180 determines whether a second touch signal is generated (S9). The second touch signal is generated according a second touch by the user. As a second touch, the user may input a long touch or a double click. At this point, the second touch signal is generated (Yes in S9), and the controller 180 changes the display of the data based on the first input mode (S11). For example, the user can zoom in the data display by touching and dragging a touch-and-drag signal towards the display change notifying icon, and the user can zoom out the data display by touching and dragging the touch-and-drag signal further away from the display change notifying icon. Further, the user can also choose to enlarge and display a particular area of the data display by touching and dragging the drag-and-drop signal, which specifies a pre-determined area of the data display.

Further in FIG. 4, if the user selects the display change notifying icon (Yes in S7), the controller 180 changes the input mode of the touch screen from the first input mode to a second input mode (S13). At this point, if the controller 180 detects a third touch signal (S14), while the input mode is changing to the second input mode, the controller 180 changes the data display on the touch screen 151 based on the second input mode (S15).

Figure 5A:
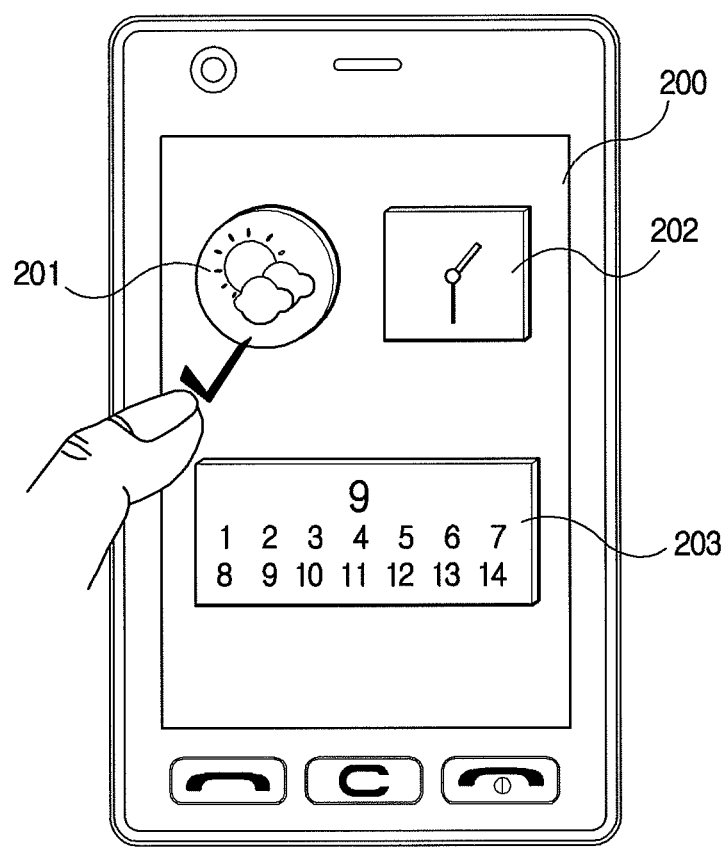
FIGS. 5A-5D are overviews of display screens illustrating a data display control method in a mobile terminal having a touch screen according to a first embodiment of the present invention.
Figure 5B:
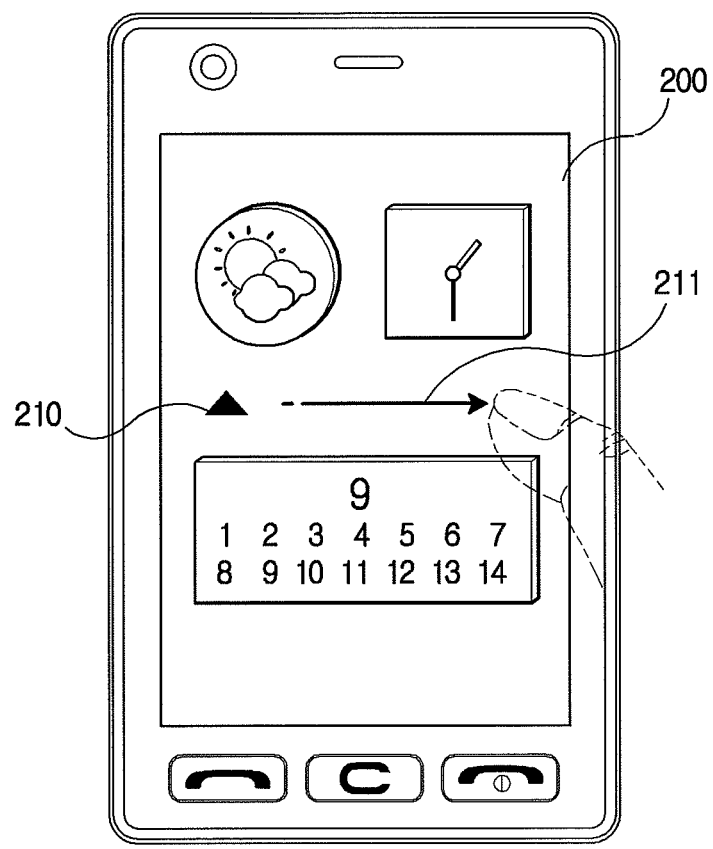

Next, methods for displaying data on the mobile terminal according to embodiments of the present invention will be described in now detail with reference to FIGS. 5A~7D. In particular, FIGS. 5A~5D illustrates a data display control method in a mobile terminal having a touch screen according to a first embodiment of the present invention. In more detail, FIG. 5A illustrates the touch screen 151 having a wallpaper 200, a weather widget 201, a watch widget 202, and a schedule widget 203. As shown in FIG. 5B, when the user inputs a long touch on a margin of the touch screen 151, the controller 180 displays a display change notifying icon 210. The long touch is just an example of an input signal for forming the display change notifying icon 210, such that the display change notifying icon may be displayed on the touch screen 151 responsive to various other input signals.

Figure 5C:
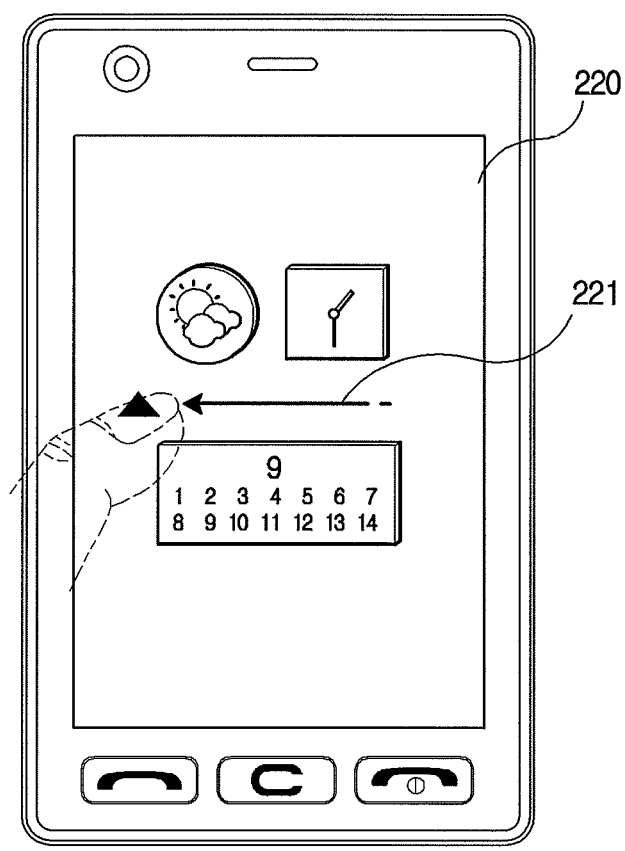
Figure 5D:
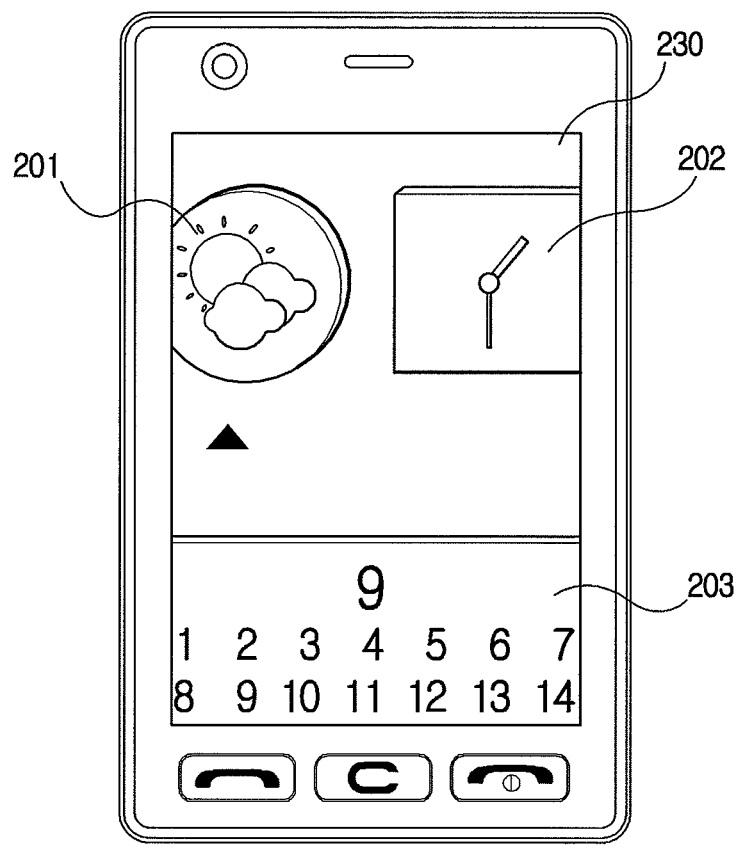

In addition, if the user touches and drags a touch-and-drag signal 211 pointing to a direction away from the display change icon 210, while the display change notifying icon 210 is displayed, the controller 180 zooms out the wallpaper 220, as shown in FIG. 5C. Further, if the user touches and drags a touch-and-drag signal 221 pointing to a direction towards the display change icon 210, while the display change notifying icon 210 is displayed, the controller 180 zooms in the wallpaper 230, as shown in FIGS. 5B and 5D. Additionally, scroll bars can be displayed on each side of the screen to scroll through a currently-displayed portion.

Further, when the user selects the display change notifying icon 210 once again, the controller 180 can delete the display change notifying icon 210. On the other hand, if the user touches and drags the touch-and-drag signal on the touch screen 151, the controller 180 can change a display based on the input signals. This embodiment may also be applied to other applications such as webpage, e-book data and zoom-in and zoom-out of image data.

Figure 6A:
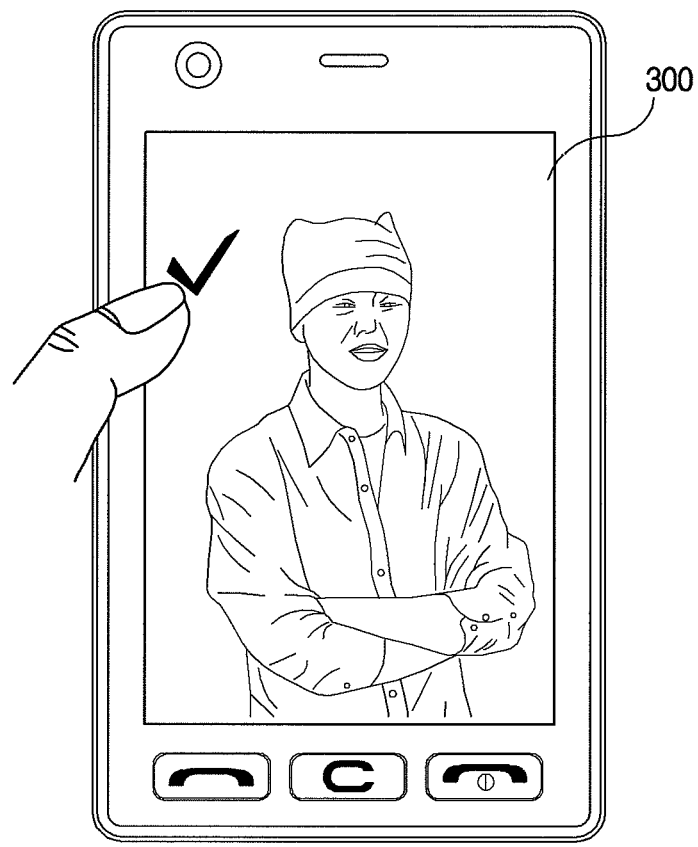
FIGS. 6A-6D are overviews of display screens illustrating a data display control method in a mobile terminal having a touch screen according to a second embodiment of the present invention.
Figure 6B:
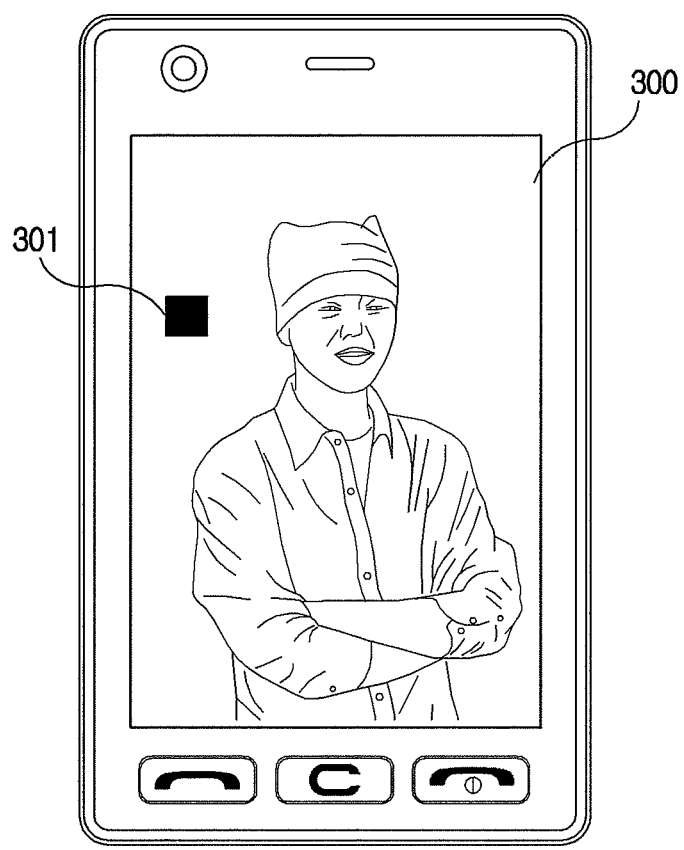

Next, FIGS. 6A~6D illustrate a data display control method according to a second embodiment of the present invention. In particular, FIG. 6A illustrates a stationary image 300. Here, the controller 180 displays a display change notifying icon 301 where the user inputs the double click signal, as shown in FIG. 6B. The double click signal input is just an example of an input signal for the display change notifying icon 301, and the display change notifying icon 301 may be displaying on the touch screen 151 responsive to various other input signals.

Figure 6C:
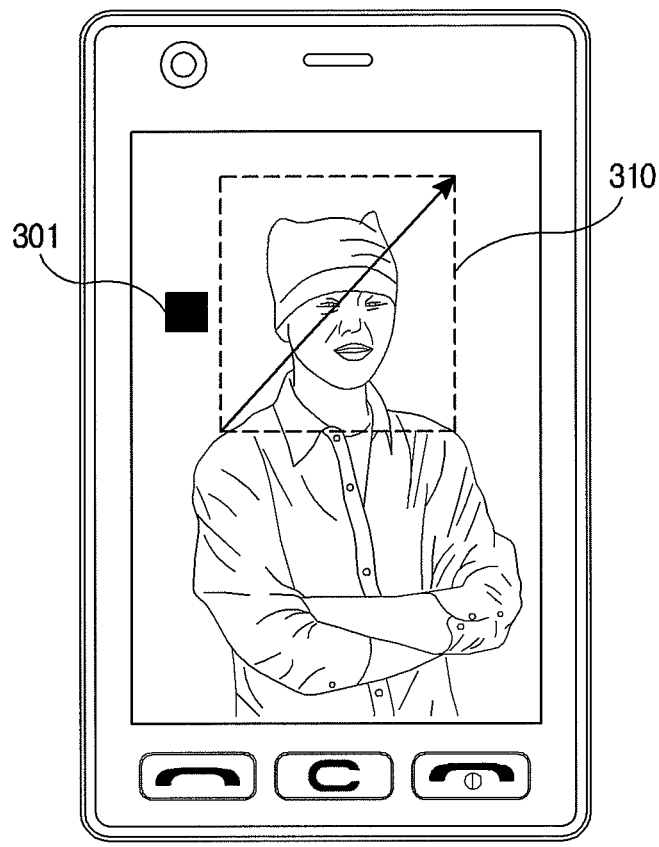
Figure 6D:

Further, the controller 180 determines a predetermined area 310 of the displayed data with the inclination direction drag-and-drop signal while displaying the display change notifying icon 301 on the touch screen 151, as shown in FIG. 6C. In turn, the controller 180 enlarges the predetermined area after a predetermined lapse of time and displays the enlarged area on an entire screen of the touch screen, as shown in FIG. 6D. Alternatively, if the user selects the display change notifying icon 301, the controller 180 can change the display change notifying icon 301 to the display change notifying icon 210, enabling the user to execute the zoom-in or zoom-out functions. The embodiment may also be applied to other applications such as webpage, e-book data, main screen and wallpaper. Thus, according to the second embodiment, an area can be enlarged as desired by the user conveniently.

Figure 7A:
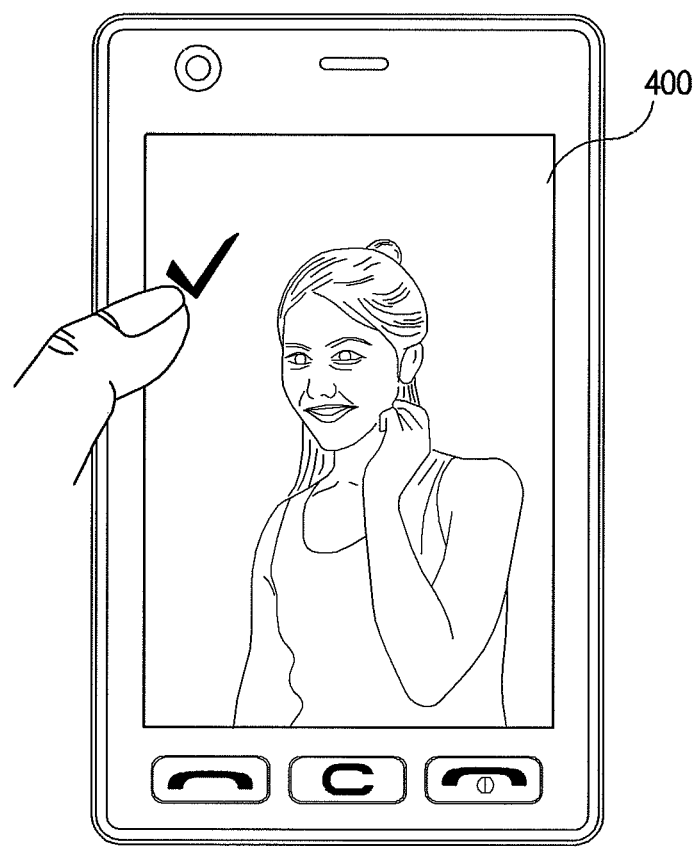
FIGS. 7A-7D are overviews of display screens illustrating a data display control method in a mobile terminal having a touch screen according to a third embodiment of the present invention.

Next, FIGS. 7A~7D illustrate a data display control method according to a third embodiment of the present invention. In particular, FIG. 7A illustrates a photo image 400 stored in a gallery menu. Here, the controller 180 displays a display change notifying icon 401 at a margin of the touch screen 151 on the photo image 400, where the user double-clicked, shown in FIG. 7B. At this point, the controller 180 simultaneously displays a menu area 410 and a page change menu 420 on the touch screen 151. Alternatively, the touch-and-drag operations can be implemented to the image 400 according to the previous examples.

Figure 7B:
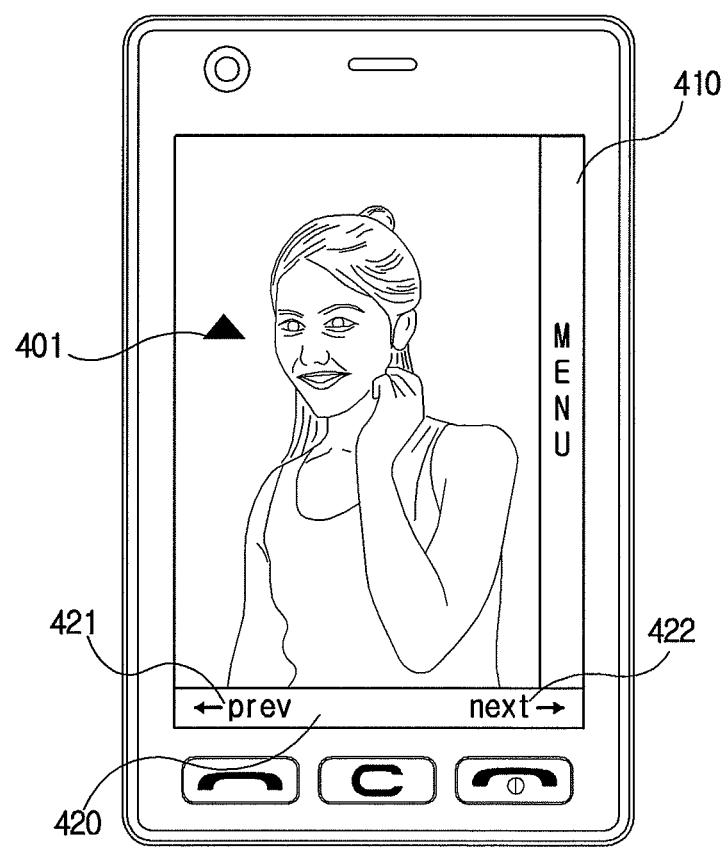

Referring to FIG. 7B, the page change menu 420 includes a previous icon 421 and a next icon 422. When the user selects the previous icon 421, the controller 180 displaying previous photo image of a gallery menu on the touch screen 151, and when the user selects the next icon 422, the controller 180 displays a subsequent photo image of the gallery menu on the touch screen 151. Further, the menu area 410 include at least a transmission menu and an edit menu.

Figure 7C:
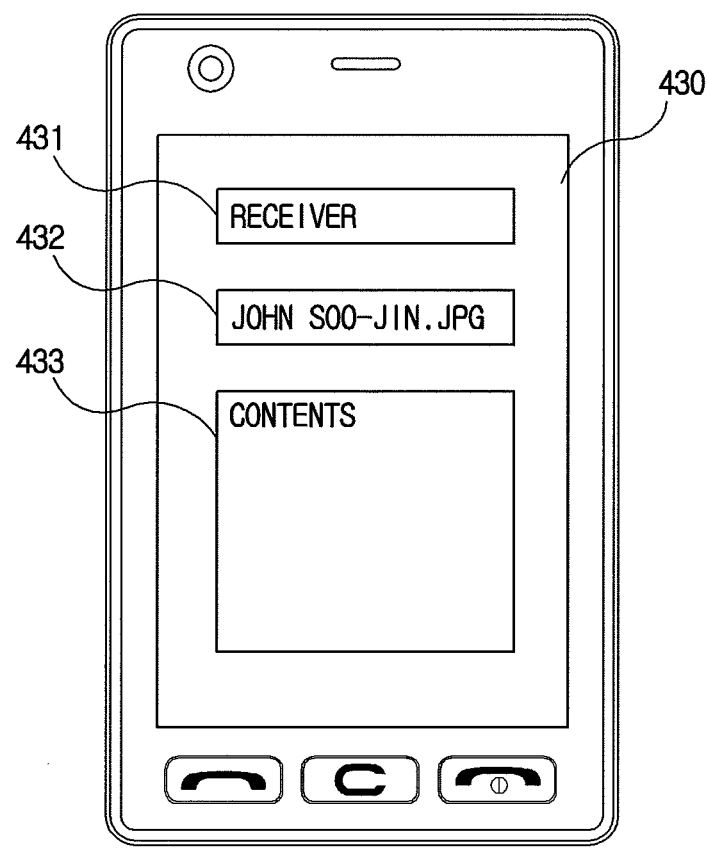
Figure 7D:
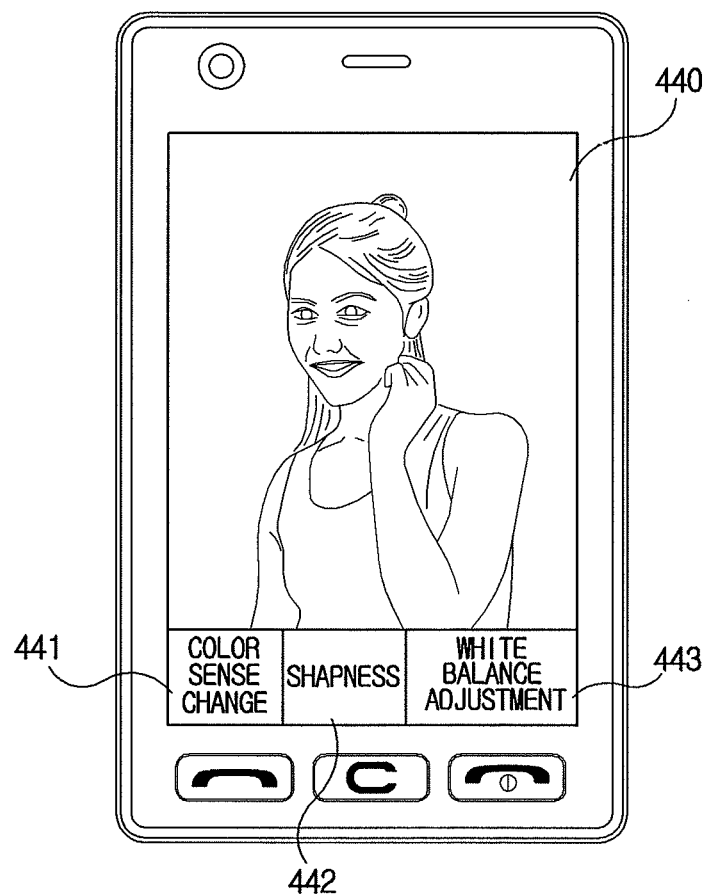

Next, FIG. 7C illustrates a multimedia message edit screen 430 configured to transmit the displayed image. When the user selects the transmission menu using the menu area 410, the controller 180 displays the multimedia message edit screen 430. As shown in FIG. 7C, the multimedia message edit screen 430 includes a receiver block 431, a file attachment block 432, and a message edit block 433. When the user selects the transmission menu from menu area 410, the controller 180 automatically attaches the displayed image at the time of the selection to a multimedia message and inserts the corresponding image file name to the file attachment block 432. Once the user completes inputting information to the receiver block 431 and the message edit block 433, the user then can select a transmission icon to transmit the displayed image and comments to a designated receiver identified on the receiver block 431. Further, FIG. 7D illustrates an edit screen 440 configured to edit the photo image. When the user selects the edit menu using the menu area 410, the controller 180 displays an edit screen 440. As shown in FIG. 7D, the edit screen 440 includes a color sense change menu 441, a sharpness change menu 442, and a white balance adjustment menu 443. The user can edit the displayed image by using these menus.

In addition, the above-described methods can be implemented in a program recorded medium as computer-readable codes. The computer-readable media may include all kinds of recording devices in which data readable by a computer system are stored. For example, the computer-readable media include ROM, RAM, CD-ROM, magnetic tapes, floppy discs, optical data storage devices, and Internet transmission.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of controlling a mobile terminal, the method comprising:

displaying, via a touch screen included on the mobile terminal, a background region and a plurality of functional widgets;

activating a zooming mode by receiving, via a controller included on the mobile terminal, a long touch or double touch one-handed input at a specified location on the background region corresponding to the location of the long touch or double touch one-handed input;

displaying, via the touch screen, a notifying icon based on the long touch or double touch one-handed input at the specified location on the background region corresponding to the location of the long touch or double touch one-handed input; and receiving a second one-handed input on a portion of the background region, the second one-handed input including at least one of a first touch-and-drag one-handed input toward the notifying icon on the touch screen, and a second touch-and-drag one-handed input away from the notifying icon on the touch screen;

wherein the second one-handed input including at least one of the first touch-and-drag one-handed input toward the notifying icon on the touch screen, and the second touch-and-drag one-handed input away from the notifying icon on the touch screen is set as a predetermined outlined area having four coordinates associated with four corners of the predetermined area, respectively, while the notifying icon is displayed, wherein a portion of the background region within the predetermined outlined area is increased to fill a whole of the touch screen as a result of the second touch-and-drag one-handed input away from the notifying icon on the touch screen being released, and wherein, when the portion of the background region within the predetermined outlined area is increased to fill a whole of the touch screen, the notifying icon does not move and stays in a fixed location on the touch screen corresponding to the location of the long touch or double touch one-handed input.

2. The method of claim 1, further comprising:
deleting, via the controller, the notifying icon when a third input for selecting the notifying icon is received on the notifying icon, the third input including a touch input.

3. The method of claim 1, further comprising:
displaying, via the touch screen, a data control menu based on the long touch or double touch one-handed input.

4. The method of claim 3, wherein the data control menu includes at least one of a page change menu, an edit menu, and a transmission menu.

5. The method of claim 1, wherein the activating of the zooming mode is based only on the long touch one-handed input, and
wherein the first and second touch-and-drag signals are horizontal touch-and-drag signals, respectively.

6. The method of claim 1, wherein the activating of the zooming mode is based only on the double touch one-handed input, and
wherein the first touch-and-drag signal is a diagonal touch-and-drag signal.

7. The method of claim 1, further comprising:
displaying an image or a blank space in the background region.

8. A mobile terminal, comprising:
a touch screen configured to display a background region and a plurality of functional widgets; and
a controller configured to:
activate a zooming mode by receiving a long touch or double touch one-handed input at a specified location on the background region corresponding to the location of the long touch or double touch one-handed input;
control the touch screen to display a notifying icon based on the long touch or double touch one-handed input at the specified location on the background region corresponding to the location of the long touch or double touch one-handed input; and
receive a second one-handed input on a portion of the background region, the second one-handed input including at least one of a first touch-and-drag one-handed input toward the notifying icon on the touch screen, and a second touch-and-drag one-handed input away from the notifying icon on the touch screen;

wherein the second one-handed input including at least one of the first touch-and-drag one-handed input toward the notifying icon on the touch screen, and the second touch-and-drag one-handed input away from the notifying icon on the touch screen is set as a predetermined outlined area having four coordinates associated with four corners of the predetermined area, respectively, while the notifying icon is displayed, wherein a portion of the background region within the predetermined outlined area is increased to fill a whole of the touch screen as a result of the second touch-and-drag one-handed input away from the notifying icon on the touch screen being released, and wherein, when the portion of the background region within the predetermined outlined area is increased to fill a whole of the touch screen, the notifying icon does not move and stays in a fixed location on the touch screen corresponding to the location of the long touch or double touch one-handed input.

9. The mobile terminal of claim 8, wherein the controller is further configured to delete the notifying icon when a third input for selecting the notifying icon is received on the notifying icon, the third input including a touch input.

10. The mobile terminal of claim 8, wherein the controller is further configured to control the touch screen to display a data control menu based on the long touch or double touch one-handed input.

11. The mobile terminal of claim 10, wherein the data control menu includes at least one of a page change menu, an edit menu, and a transmission menu.

12. The mobile terminal of claim 8, wherein the controller is further configured to display an image or a blank space in the background region.

* * * * *